No. 647,708. Patented Apr. 17, 1900.
C. SCHWAGER.
DRUM FOR WASHING, SOAKING, AND AERATING GRAIN.
(Application filed Mar. 30, 1899.)
(No Model.)
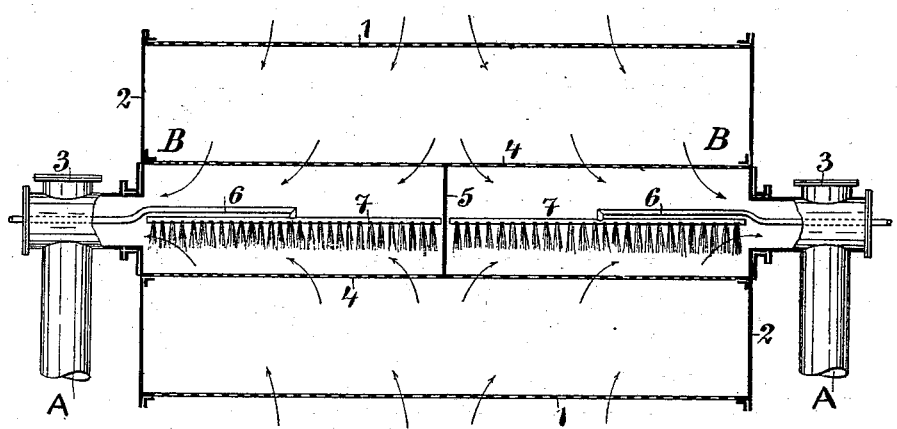
Witnesses:
Inventor:
Conrad Schwager

UNITED STATES PATENT OFFICE.

CONRAD SCHWAGER, OF CHARLOTTENBURG, GERMANY.

DRUM FOR WASHING, SOAKING, AND AERATING GRAIN.

SPECIFICATION forming part of Letters Patent No. 647,708, dated April 17, 1900.

Application filed March 30, 1899. Serial No. 711,157. (No model.)

*To all whom it may concern:*

Be it known that I, CONRAD SCHWAGER, a subject of the German Emperor, residing at Charlottenburg, Germany, have invented certain new and useful Improvements in Drums for Washing, Soaking, and Aerating Grain, of which the following is a specification.

The purpose of the construction of the drum represented in the annexed drawing in longitudinal section is to introduce continually to the grain while soaking fresh air and fresh water in the required quantities and to clean the grain at the same time by rubbing the grain together by the rotating effect of the drum. All the grains are brought into touch with water and air, so that while soaking the grain already begins to germinate.

The construction of the drum is as follows: The outer drum-mantle 1 consists of perforated sheets, while the end walls 2 consist of plain sheets. The drum itself is connected movably in the known manner with stationary air-suction tubes 3, intended to be in communication with any suitable suction device or devices. Inside the drum is a longitudinal tube 4, provided in the middle with a non-perforated transverse diaphragm 5. The tube 4 consists also of perforated sheets. The sectional area of the opening of the holes in tube 4 increases toward the middle of the length of the tube, so that the air is not only sucked up near the suction-tube 3, perhaps at B, out of the inner part of the drum, but also from the middle of the drum. Holes of the same section may be used provided the distance between them decreases toward the middle of the tube.

Through the heads 3 stationary tubes 6 are passed to water-distributing pipes 7, lying inside of and along the tube 4, for equal irrigation of the grain.

As air is drawn from the drum at A fresh air will enter through mantle 1 and, on account of the diminishing hole-sections of tube 4, pass equally through the grain. By means of the water-distributing pipes 7 the grain is wetted and the flow can be regulated as desired. The equal airing of the drum is effected by the air-passage sections diminishing toward the ends of tube 4, and moreover and chiefly because the suction of air is effected from both sides at the same time.

I claim as my invention—

An improved drum for washing, soaking, and aerating grain comprising in combination a perforated mantle, a central perforated tube 4 within said mantle having the sectional area of perforation increasing from the ends toward the middle of its length, a separating-diaphragm in tube 4 midway of its length, water supplying and distributing pipes 6 and 7, and tubes through which air may be sucked simultaneously from both ends of the drum for the purpose set forth.

In witness whereof I have signed this specification in the presence of two witnesses.

CONRAD SCHWAGER.

Witnesses:
 WILLIAM MAYNER,
 WOLDEMAR HAUPT.